June 13, 1933.    E. A. STALKER    1,913,644
MEANS OF ENERGIZING THE BOUNDARY LAYER ON AIRCRAFT PARTS
Filed Nov. 18, 1931    3 Sheets-Sheet 2

INVENTOR
Edward A. Stalker

June 13, 1933.   E. A. STALKER   1,913,644
MEANS OF ENERGIZING THE BOUNDARY LAYER ON AIRCRAFT PARTS
Filed Nov. 18, 1931   3 Sheets-Sheet 3
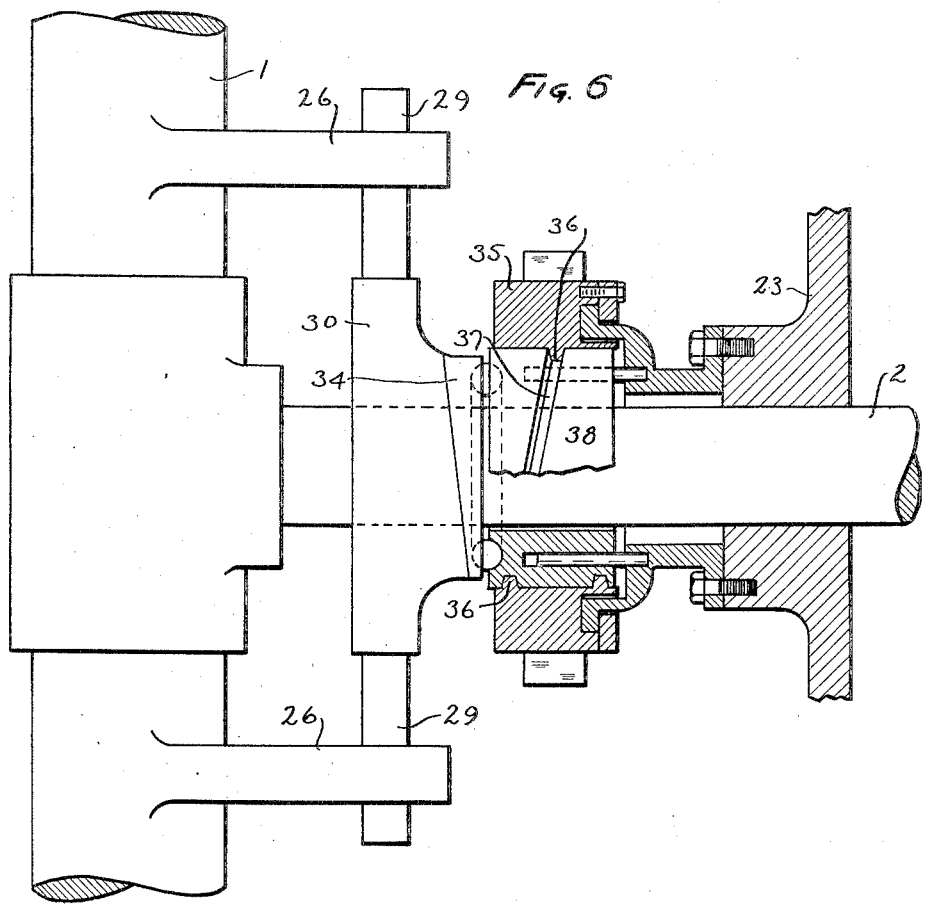
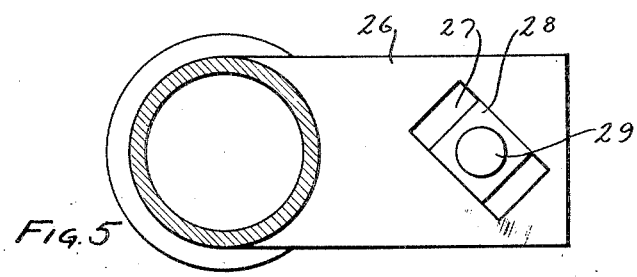
Inventor
Edward A. Stalker
By Marechal & Noe
Attorney Patented June 13, 1933

1,913,644

UNITED STATES PATENT OFFICE

EDWARD A. STALKER, OF ANN ARBOR, MICHIGAN

MEANS OF ENERGIZING THE BOUNDARY LAYER ON AIRCRAFT PARTS

Application filed November 18, 1931. Serial No. 575,754.

My invention relates to aircraft in which the boundary layer of air on the wings or other parts is energized or removed. This case is a continuation in part of my prior application Serial No. 515,471 filed February 13, 1931.

The principal object of the present invention is the provision of means for removing the boundary layer, this means being energized by reason of the relative wind with respect to the aircraft.

A further object is the provision of a wind driven pump for removing the boundary air layer the pump being operably connected to and driven by the engine propeller, which may be released from the propelling engine and operated at a suitable and efficient speed of rotation.

Another object is the provision in an arrangement of the character mentioned, of a propeller which is connected to the engine by a speed reducing gearing so that the propeller and engine may both operate at efficient speeds.

Further objects and advantages will be apparent from the following description and drawings and from the appended claims.

In the drawings,—

Fig. 5 is a sectional detail taken through a propeller blade near the hub; and

Fig. 6 is a longitudinal sectional view of the pitch changing mechanism.

Figure 1:
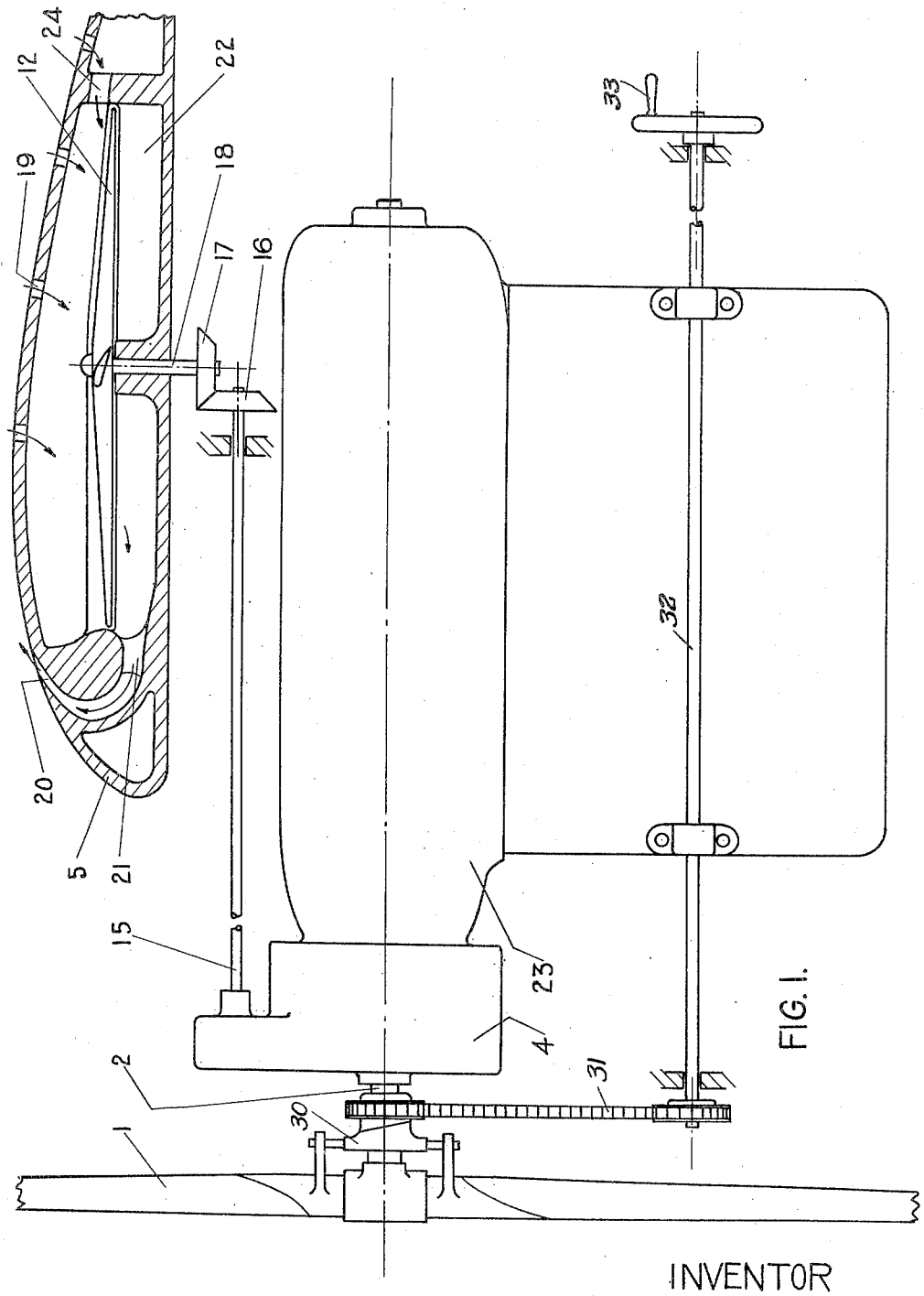
Fig. 1 is a side view of the propulsive unit, and a portion of the wing, which is shown in section.
Figure 2:
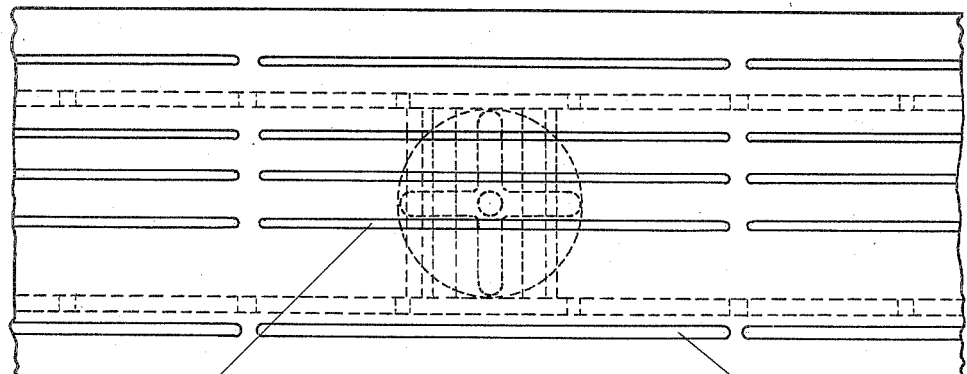
Fig. 2 is a plan view of a part of the wing.

Referring more particularly to the drawings by reference characters, the aircraft propeller 1 is provided with a hub portion which is fixed to the shaft 2. Interposed between the shaft 3 which is driven by the airplane engine, and the propeller 1, is suitable power transmitting means embodying a one way clutch which permits the propeller to overrun the engine shaft 3. The power transmitting mechanism is preferably of such character as to cause operation of the propeller at a speed substantially less than the speed of the shaft 3, when being driven by the engine. As shown, the engine shaft 3 carries a pinion 6 which engages with the gears 7 and 8. These gears 7 and 8 are mounted on fixed axes, being rotatably supported on the engine case 9. The gears 7 and 8 engage a gear 10 which is provided with internal teeth, so that the gear 10 is rotated at a speed less than the speed of the shaft 3. Between the outer periphery of the gear 10 and the case 11 are clutch balls 11' which are wedged or compressed between the case 9 and the gear 10 when the propeller is driven by the engine. However they permit the rotation of the propeller at speeds greater than engine speed, the balls then rolling into wider spaces between the gear 10 and the case, 11, being held in these wider spaces without any wedging action. It is clear that the propeller 1, acting as a windmill and driven by the relative wind may turn the case 11 without turning the engine, the one way clutch of which the balls 11' form a part acting automatically. The case 11 is provided with gear teeth 13 on its outer periphery which mesh with a gear 14 fixed to a shaft 15. At the other end of the shaft 15 is a bevel gear 16 which engages with a bevel gear 17 provided on a fan or pump shaft 18. Mounted on the fan shaft 18 is a fan or pump impeller 12.

Figure 3:
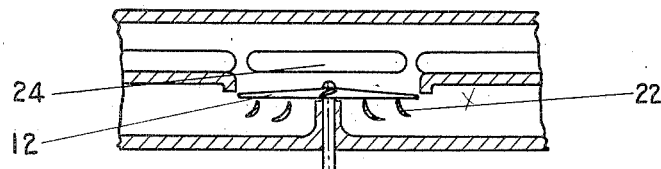
Fig. 3 is a vertical section taken spanwise through the wing.
Figure 4:
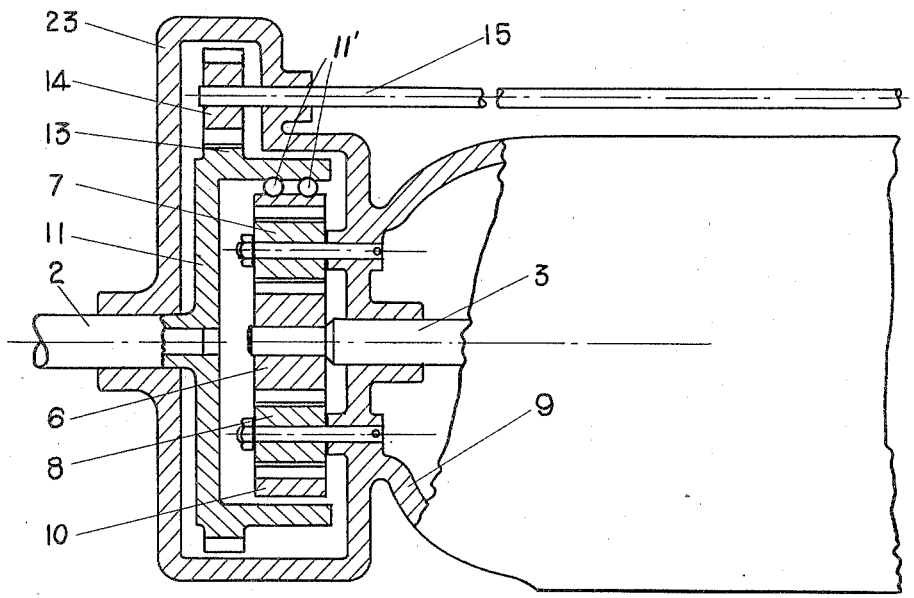
Fig. 4 is a vertical section through the gear reduction and clutch unit.

Openings 19 are provided in a rear portion of the wing for removal of the boundary layer of air which may be sucked down from the upper surface of the wing by the action of the pump or impeller 12. The air which is withdrawn into the wing through the openings 19 is preferably, as shown, blown out of the slot or opening 20, the stream of air issuing from this opening being directed tangentially rearwardly of the wing so as to add energy to the boundary layer of air on the wing surface. A suitable passage 21 is provided in the spar so that the air can enter the leading edge portion of the wing. The air forced downwardly from the fan 12 is guided along the wing between the spars by suitably grooved vanes 22 as shown in Fig. 3.

The propeller 1 is of the adjustable pitch character. The propeller blades are rotatable in the hub portion, under the control of the operator. Each propeller blade is provided with a rearwardly extending lug 26. In each lug is a slot 27, receiving a slide block 28, and so cut that when the block 28 is moved toward the blade axis the blades will be rotated at the hub so as to change their pitch. This movement of the blocks 28 is obtained through two pins 29 carried on a rotatable member 30 which can be moved forwardly or rearwardly from the direction of the propeller axis by means of a sprocket chain 31 operated from a shaft 32 having a manually controllable hand wheel 33 or the like.

The rotatable member 30 has an inclined side cooperating with the inclined side of an adjusting member 34 as shown in Fig. 6. The sprocket operated part 35 is held against axial movement and rotatably mounted on the gear housing 23. It is provided with a tooth 36 engaging in a spiral groove 37 on a control part 38 which is non-rotatably mounted but movable axially on the shaft 2. The outer face of the control part 38 and the inner face of the adjusting member 34 is preferably provided with antifriction or ball bearings so that the members 30 and 34 may rotate with the propeller while the control part 38 is held stationary although the axial position of the control part 38 and of the rotatable member 30 is at all times under the control of the operator thus affording a control for the propeller pitch.

The removal of the boundary layer of air on an airfoil surface improves the lift and reduces the resistance. When the boundary layer is removed the result is an energization of the boundary layer to replace its energy lost by friction with the aircraft surface. This treatment of the boundary layer is an energization or acceleration of it. In accordance with the present invention it will be understood that the propeller may be driven by the engine, the engine at the same time causing suitable operation of the pump of fan 12 so as to cause the desired energization of the boundary layer on the wing surface. Under such conditions the pitch of the propeller blades would be so adjusted as to obtain the best operating efficiency. In case of engine failure, or in the maneuver of landing, the engine may be operating at a low speed, or may be stopped, but the propeller may continue operation, being driven from the relative wind, and the pitch of the propeller may be so adjusted that it operates at an efficient speed as a wind driven impeller, supplying power to drive the fan or pump 12.

In accordance with the preferred arrangement of my invention, the speed of the propeller when driven from the engine is preferably considerably less than engine speeds so that both the engine and the propeller can operate most efficiently. It may be shown on theoretical grounds that the power output P of the windmill is given by P equals 0.232 times the third power of the relative wind velocity times the second power of the windmill diameter times the mass density of the air. If a motor turning 2000 revolutions per minute has a propeller of 9 feet diameter and gearing is used to reduce the propeller revolutions to 1000 revolutions per minute, the diameter required by the power will be about 13 feet. The windmill will then generate about twice as much power since the square of the quotient of 13 by 9 is about 2.

Furthermore with the gear reduction employed, the blower may be operated at full capacity at all times including those periods when the engine is idle, for by increasing the diameter of the propeller and using the gear reduction between the engine and the propeller, the blower may be made to operate at the same speed per minute at all times and regardless of whether the blower or fan 12 is being operated by the motor or by the wind driven propeller. The weight per unit of power of the engine decreases as the rate of rotation of the engine increases, so it is advantageous to run the engine at high speed. The propeller efficiency increases also as its rate of rotation decreases. Hence an efficient airscrew which may be operated efficiently as a wind driven impeller, as well as a light engine and a uniform pumping action are obtained in accordance with the preferred construction herein set forth.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination in an aircraft possessing openings in its surface, an airscrew and a prime mover to drive the airplane, a pump to cause a flow through the openings, and a means to use the propulsive airscrew as a turbine to operate the pump.

2. In combination in an aircraft possessing openings in its surface, a propulsive unit consisting of a propeller and a prime mover, a pump to accelerate the boundary layer through the surface openings and means to disengage the propeller and pump from the action of the engine shaft.

3. In combination in an aircraft possessing openings in its surface, a propulsive unit consisting of a prime mover and a sub-unit consisting of a propeller and a pump, means to disengage the propeller and pump unit from the engine, and means to permit an acceleration of the boundary layer by the pump.

4. In combination in an aircraft, a propulsive unit consisting of a prime mover and a sub-unit which consist of a propeller and pump, means to disengage the propeller and pump unit from the engine and means to alter the pitch of the propeller.

5. In combination in an aircraft possessing openings in its surface, a propulsive unit consisting of a prime mover and a sub-unit consisting of a propeller and a pump, means to drive the propeller and pump unit by the engine, means to disengage the propeller and pump unit from the engine, means to permit an acceleration of the boundary layer by the pump and means to alter the pitch of the propeller.

6. In combination in an aircraft possessing openings in its surface, a propulsive unit consisting of a prime mover and a sub-unit consisting of a propeller and a pump, means to disengage the propeller and pump unit from the engine, means to permit the pump to cause a flow of air, through the openings, and means to alter the pitch of the propeller.

7. In combination in an aircraft possessing openings in its wing surface, an airscrew and a prime mover to drive the airplane, a means of pumping to cause a flow through the openings and means to use the airscrew as a prime mover to operate the pumping means.

8. In combination in an aircraft possessing openings in the wing surface, a propulsive airscrew and prime mover, means of pumping to energize the boundary layer, means to disengage the airscrew and pumping means from the action of the engine shaft.

9. In combination in an aircraft having openings in its surface, an airscrew, a prime mover, a blower to cause a flow through the openings to energize the boundary layer, means operably connecting the blower and airscrew, means to drive the airscrew from said prime mover at a speed below that of the prime mover, and an automatic overrunning clutch connection from the airscrew to the prime mover so that as a windmill the airscrew may drive the blower.

10. In combination in an aircraft an airscrew, a prime mover, a wing having openings in the upper surfaces thereof, a blower operably connected to the airscrew to cause a flow through the openings to energize the boundary layer, means to drive the airscrew from the prime mover at a lower speed than the speed of the prime mover, and means to relieve the airscrew of the prime mover torque so that as a windmill the airscrew may drive the blower.

11. In combination in an aircraft an airscrew, a prime mover, a wing having openings in the upper surfaces thereof, a blower arranged to cause an outward flow through the openings to energize the boundary layer, means to drive the blower by the airscrew acting as a windmill and means to release the airscrew from the prime mover.

12. In combination in an aircraft, a prime mover, a wing having openings in the upper surface thereof and an additional opening inclined rearwardly and upwardly, a blower to cause a flow inward through said first openings and outward through said additional opening, means operably connecting the blower to the airscrew, and means to release the airscrew from the prime mover.

13. In combination in an aircraft, a prime mover, an aircraft wing having openings in the upper forward surface thereof inclined rearward and upward with respect to the surface, a blower to cause a flow out through the openings, means to drive the blower from the airscrew, and means to release the airscrew from the prime mover.

14. In combination in an aircraft an airscrew, a prime mover, a wing having openings in the upper surfaces thereof, a blower to cause a flow through the openings, means to drive the airscrew by the prime mover at a lower speed than the prime mover, automatic clutch means providing for operation of the blower by the airscrew acting as a windmill, and means to vary the pitch of the airscrew.

In testimony whereof I have hereunto affixed my signature.

EDWARD A. STALKER.